(12) United States Patent
Ketonen

(10) Patent No.: US 6,202,719 B1
(45) Date of Patent: Mar. 20, 2001

(54) TIMBER HARVESTER AND A FEEDER DEVICE FOR IT

(76) Inventor: Lauri Kalervo Ketonen, Huvulakatu 15, FIN-64100, Kristiinankaupunki (FI)

( * ) Notice: Subject to any disclaimer, the term of this patent is extended or adjusted under 35 U.S.C. 154(b) by 0 days.

(21) Appl. No.: 09/529,309

(22) PCT Filed: Nov. 12, 1998

(86) PCT No.: PCT/FI98/00880

§ 371 Date: Apr. 11, 2000

§ 102(e) Date: Apr. 11, 2000

(87) PCT Pub. No.: WO99/25526

PCT Pub. Date: May 27, 1999

(30) Foreign Application Priority Data

Nov. 14, 1997 (FI) .......................................... 974250
May 8, 1998 (FI) .......................................... 981021

(51) Int. Cl.[7] ...................... A01G 23/08; A01G 23/095; B27B 25/04

(52) U.S. Cl. .................. 144/24.13; 144/4.1; 144/245.2; 144/338; 144/343; 198/626.1; 198/692

(58) Field of Search ...................... 144/4.1, 24.12, 144/335, 336, 338, 343, 242.1, 245.1, 245.2; 198/626.1, 692, 699.1, 837

(56) References Cited

U.S. PATENT DOCUMENTS 4,883,159  11/1989  Ketonen .

FOREIGN PATENT DOCUMENTS

| 502863 | 5/1920 | (FR) . |
| 767764 | 7/1934 | (FR) . |
| 391628 | 1/1972 | (SE) . |
| WO 8505589 | 12/1985 | (WO) . |

*Primary Examiner*—W. Donald Bray
(74) *Attorney, Agent, or Firm*—Kilpatrick Stockton

(57) ABSTRACT

The present invention relates to a timber harvester (10), which includes two opposing jointed feed devices (14), stripping blades (15), and a cutting device (16). The frame (21) of the feed device (14) is set on articulated arms (13), and in which the feed device (14) in a roller chain (17) of one or more rows of links, set to rotate round a drive cog (24), a turning member (25), and slightly curved slide guides (22, 23).

9 Claims, 3 Drawing Sheets

TIMBER HARVESTER AND A FEEDER DEVICE FOR IT

The present invention relates to a timber harvester, which includes two feeder devices jointed opposite one another, stripping blades, and a cutting device, and in which the frame of the feeder device is set on jointed arms. The invention particularly relates to the feeder device used in the timber harvester, which includes a roller chain of two or more rows of links set to travel around a drive cog, a turning device, and slide guides, which extend over the major length of the adhesion side between the drive cog and the turning device.

Patent publications WO 85/05589 (Ketonen,=EP 218 584), FI 84009, and FI 83831 describe feeder track devices intended for timber harvesters and especially for grab harvesters. Years of experience have shown that the best of these devices is the feeder device according to the Wo publication, in which a roller chain, which is supported by slide guides at least on the adhesion side, is used as a crawler track. It is preferable to use a three-row roller chain, in which the middle row of chain links is staggered in relation to the outer rows. In addition, a drive cog driving only one row of links, the centre row, is used, so that the outer slide guides extend to the line of the axle of the drive cog and preferably to the area where the crawler track turns. This solution directs most of the point stresses of the crawler track directly onto the slide guides. Over the short transitional area, the outer rows of links between the slide guides and the drive cog carry the central row of links.

The feeder track device according to the WO publication is jointed so that it can twist slightly according to the direction of the feed of the tree if the tree is not fed exactly parallel to the harvester. The moment caused by the feeding movement increases the loading pressure in the exit end.

Generally, the turning member acting against the drive cog is an idler wheel, but alternatively simple slide surfaces can act as a turning member.

Traditionally, the feeder track device has competed with feeder roller devices. The crawler track, which corresponds to an infinitely large wheel, by means of its long adhesion surface, uses a small surface pressure to create a reliable and stable contact with the tree. The roller's problem, despite various surface members that improve adhesion, is often a point-like contact, which easily gives rise to random, indiscriminate damage to the surface of the timber. Chains and surface plates used in rollers initially improve adhesion, but become clogged with material from bark torn from the timber. This kind of clogging is unlikely with a crawler track, because the variation in the curvature of the track as it rotates cleans it effectively.

This invention is intended to simplify both a timber harvester using a feed track and the feed track itself. A timber harvester according to the invention is characterized in terms of the accompanying claim 1, while the improved feeder track is characterized in terms of claim 6. In a feeder track according to the invention, the infinite radius of curvature of the earlier track is set to a finite value, which alters the nature of the track. A crawler track according to the invention behaves partly according to the radius of curvature of the point of adhesion, i.e. like a large diameter feed roller, but in this case the track cleans itself, because the radius of curvature varies greatly during a single rotation. In addition, a small amount at the drive cog is sufficient to drive the crawler track. In any event, the curvature is so great that the adhesion surface becomes quite long. A feeder track according to the invention is preferably rigidly attached to its articulated driving arm. The curvature of the feeder track permits small differences in the angle of the feed of the tree. A curved and especially convex construction concentrates the greatest load at the nip point, where the slide surfaces act effectively. In the vicinity of the drive cog and correspondingly the idler wheel, there is no longer any load.

The invention is next described with reference to the accompanying illustrations, which show one timber harvester according to the invention and the feeder device used in it.

Figure 1:
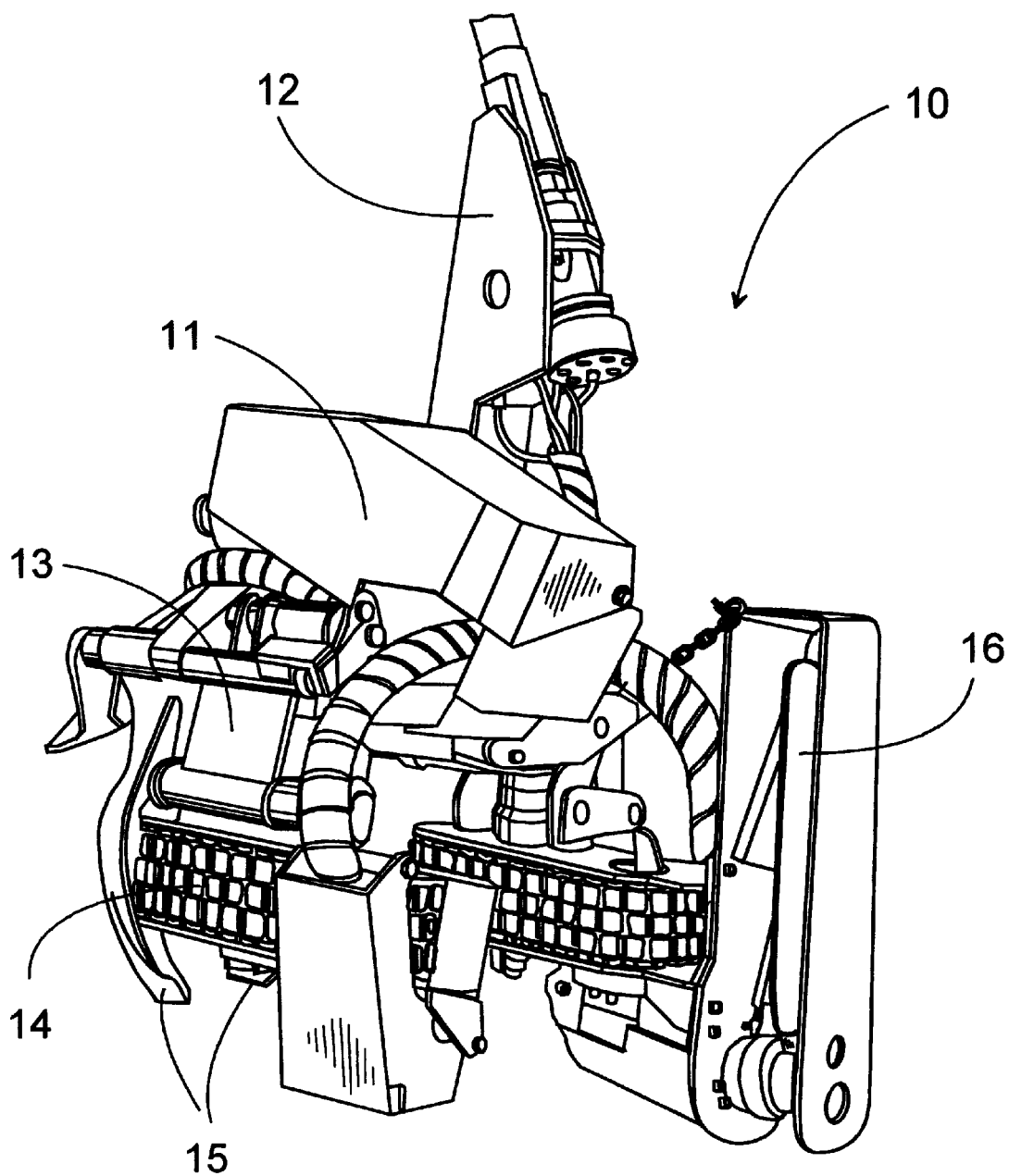
FIG. 1 shows seen at an angle from the rear.

The most common timber harvester in use nowadays is the grab harvester, which is shown generally in FIG. 1 by reference number 10. Its principal components are a frame 11, a carrier device 12, feeder devices 14, their articulated arms 13, and a saw 16 used as a cutting device. The feeder devices 14 and the cutting blade 15 are operated by hydraulic cylinders and squeeze the tree 1 being processed into their jaw. The feeder devices 14 pull the tree 1 through the jaw.

Figure 2:
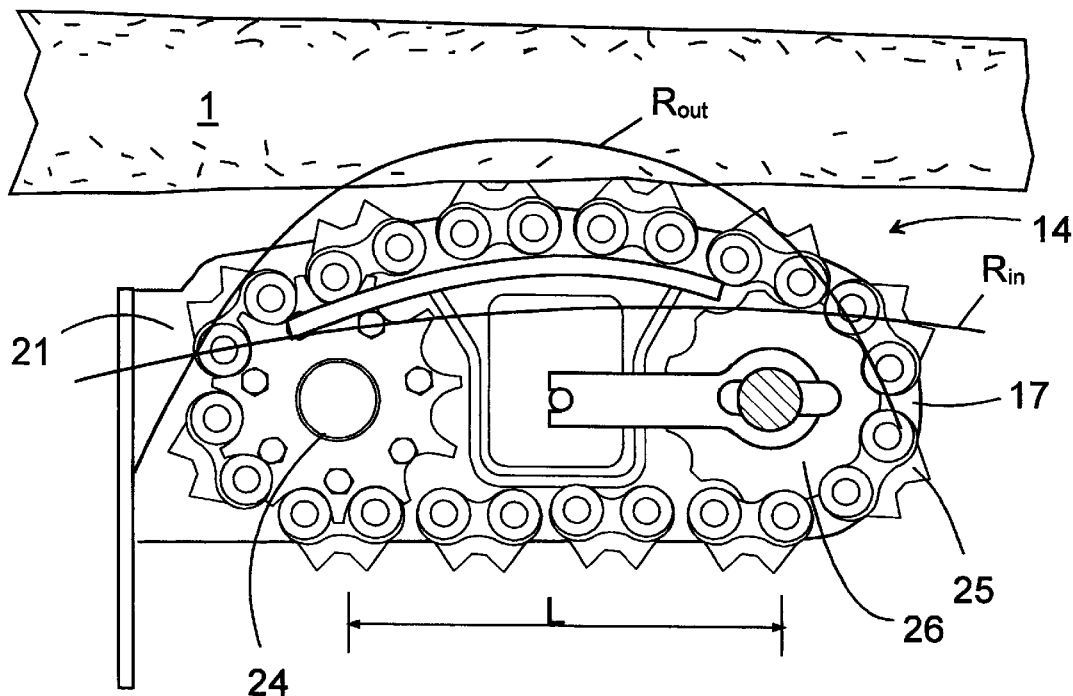
FIG. 2 shows a side view of a cross-section of the feeder device, without the attached saw unit.
Figure 3:
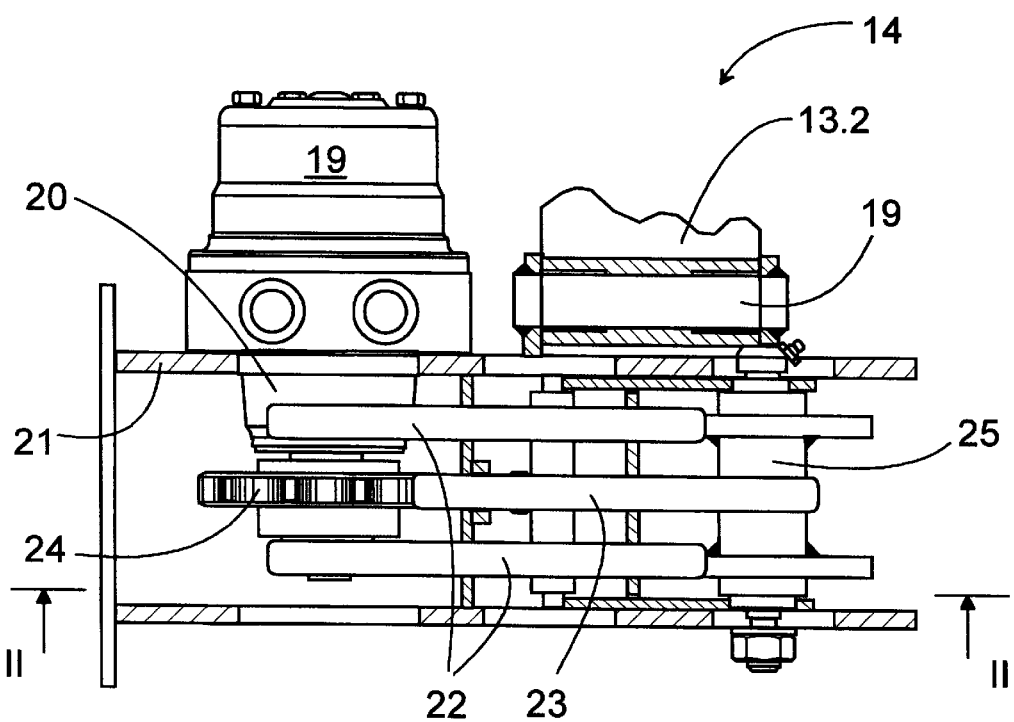
FIG. 3 shows a top view of the feeder device in FIG. 2, without the crawler track.

The basic construction of the feeder device 14 is the same as in the aforementioned WO publication, FIGS. 2 and 3. A three-row crawler track 17 is set to rotate around a drive cog 24, slide guides 22, 23, and an idler wheel 25. Devices 26 for adjusting the tension of the crawler track are connected to the idler wheel 25. The drive cog 24 drives the middle row of links 17.1 while the outer rows of links 17.2 are supported by the idler roller. On the drive cog side, the outer slide surfaces 22 extend to the line of the axle of the cog and even beyond it, while correspondingly on the idler side the centre slide surface extends over the axle line of the idler. By means of this arrangement, the loadings of the crawler track 17 in the transition area are brought well under control, though this is no longer as critical as in the construction according to the aforementioned WO publication. This is because the convex shape of the crawler track gives rise to an effect that concentrates the loading in the middle of the adhesion length of the nip. A three-row, staggered, crawler track is, however, still preferable with this drive arrangement. The drive motor 19 and its bearing 20 fit partially inside the crawler track 17.

The convex shape of the crawler track 17 on the adhesion side is created by means of convex slide guides 22, 23. The most preferable shape of the slide guides 22, 23 corresponds over the greatest length to a curve, the radius of which is 0.8–1.2 times the characteristic centre distance L (i.e., the distance between the centres of the drive cog 24 and the idler wheel 25). Generally, the protrusion caused by the convexity is at least 1 cm, preferably 3–6 cm. Further, the slide guides 22, 23 are located on the adhesion side between such curves $R_{in}$ and $R_{out}$ as are tangential to the drive roller 24 and the turning member 25, and which are defined by the formulae $R_{out}=0.6 \times L$ and $R_{in}=2.5 \times L$, in which L is the characteristic centre distance, i.e. the distance between the centres of the drive cog 24 and the idler wheel 25.

According to FIG. 2, the grip spikes 18 of the crawler track 17 dig into the bark of the tree 1. Due to the large curve, the nip is extensive and the surface damage to the tree is controlled and even. The length of the grip spikes 18 essentially determines the depth and nature of surface damage.

In one grab harvester according to the Figure, the centre distance was 300 mm and the radius of the curvature of the slide guides also 300 mm, corresponding to a 600-mm wheel. The drive cog of the hydraulic motor was 120 mm, i.e. the ratio of the cog to this calculatory wheel was 5. In this case, the axle of the hydraulic motor is only loaded by the forces arising from driving the crawler track, when the axle of the feed roller must also carry the compressive forces.

Figure 4:
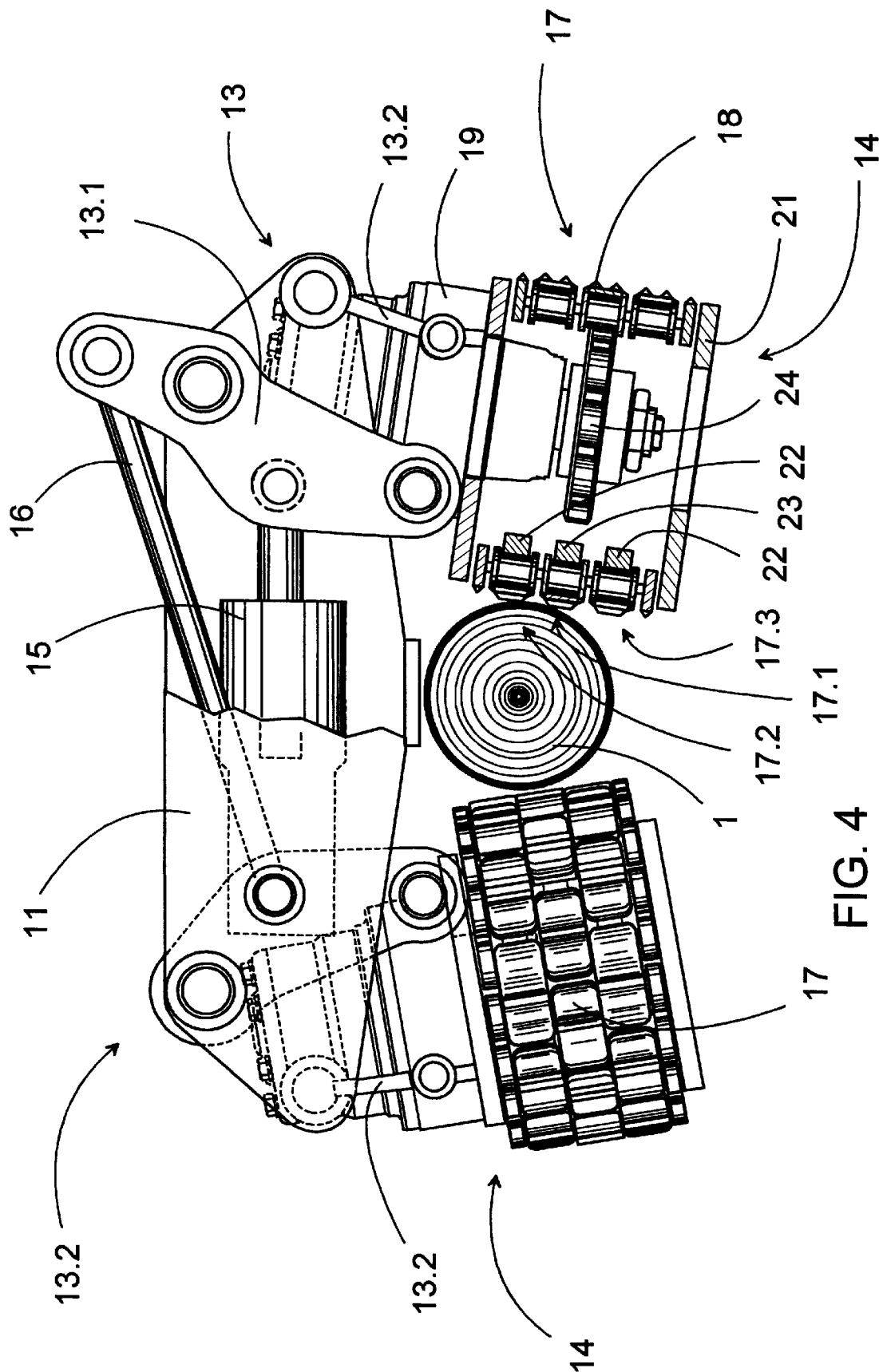
FIG. 4 shows the timber harvester's grip, with a cross-section of one of the feeder tracks.

According to FIG. 4, a convex crawler track according to the invention permits the feed devices 14 to be attached directly to the articulated arm 13, without a rotating joint. Here the trapezium arms 13.1 and 13.2 are jointed directly to the frame 21 of the feed device 14. At the other end they are jointed in a known manner to the frame 11 of the grab harvester 10. The opposing articulated arms 13.1 are driven by hydraulic cylinder 15 while equalizer arm 16, in a known manner, forces their movement to be symmetrical. The other components of the grab harvester have been left out of FIG. 4.

The feed device according to the invention is particularly applicable to logs and fibre timber with thick bark. The invention reduces the weight of the entire grab harvester and simplifies its construction.

What is claimed is:

1. A timber harvester (10), which includes two opposing jointed feed devices (14), stripping blades (15), and a cutting device (16), and in which the frame (21) of the feed device (14) is set on articulated arms (13), and in which the feed device (14) includes a roller chain (17) of one or more rows of links, set to rotate r ound a drive cog (24), a turning member (25), and slide guides (22, 23), which extend, on the adhesion side, over most of the length between the drive cog (24) and the turning member (25), characterized in that the slide guides are convex on the adhesion side, so that the protrusion due to the convexity is at least 1 cm, preferably 3–6 cm and the slide guides (22, 23) lie on the adhesion side between such curves $R_{in}$ and $R_{out}$ that are tangential to the drive roller (24) and the turning member (25) and which are defined by the formulae:

$R_{out}=0.6\times L$ and $R_{out}=2.5\times L$, in which L is the characteristic center distance, i.e. the distance between the centers of the drive cog (24) and the turning member (25), and the curved slide guides (22, 23) create a grip by directing the nip against the tree (I).

2. A timber harvester (10) according to claim 1, characterized in that the slide guides (22, 23) correspond over most of their length to a curve with a radius 0.8–1.2 times the characteristic centre distance L.

3. A timber harvester (10) according to claim 1, characterized in that the roller chain (17) has three rows and that the central row of links (17.1) is staggered in relation to the outer rows of links (17.2) and that the drive cog (24) is applied to drive this centre row of links (17.1).

4. A timber harvester (10) according to claim 1, characterized in that the slide guides (22, 23) are formed by bars, which are attached to the track frame (21) by their centers, leaving the ends free.

5. A timber harvester (10) according to one of the above claims 1–4, characterized in that the articulation of the feed device (14) permits the feed device to rotate around only one axis, essentially around the longitudinal axis.

6. A tree feeder device (14), which includes a frame (21), a roller chain (17) of one or more rows of links, set to rotate round a drive cog (24), a turning member (25), and slide guides (22, 23), which extend, on the adhesion side, over most of the length between the drive cog (24) and the turning member (25), characterized in that the slide guides (22, 23) of the feed device (14) are convex on the adhesion side, so that the protrusion due to the convexity is 3–6 cm and the curved slide guides (22, 23) lie in this area between such curves $R_{in}$ and $R_{out}$ that are tangential to the drive roller (24) and the turning member (25) and which are defined by the formulae: $R_{out}=0.6\times L$ and $R_{in}=2.5\times L$, in which L is the characteristic centre distance, i.e. the distance between the centres of the drive cog (24) and the turning member (25).

7. A feed device (14) according to claim 6, characterized in that the slide guides (22, 23) correspond over most of their length to a curve with a radius 0,8-1,2 times the characteristic center distance L.

8. A feed device (14) according to claim 6, characterized in that the roller chain (17) has three rows and that the central row of links (17.1) is staggered in relation to the outer rows of links (17.2) and that the drive cog (24) is applied to drive this center row of links (17.1).

9. A feed device (14) according to claim 7, characterized in that the roller chain (17) has three rows and that the central row of links (17.1) is staggered in relation to the outer rows of links (17.2) and that the drive cog (24) is applied to drive this center row of links (17.1).

* * * * *